United States Patent Office 3,641,097
Patented Feb. 8, 1972

3,641,097
PREPARATION OF PHENYLALANINE DERIVATIVES AND NOVEL INTERMEDIATES

Balthasar Hegedüs, Binningen, and Paul Zeller, Allschwil, Switzerland, assignors to Hoffmann-La Roche Inc., Nutley, N.J.
No Drawing. Continuation-in-part of application Ser. No. 684,623, Nov. 21, 1967. This application Oct. 30, 1968, Ser. No. 772,048
Claims priority, application Switzerland, Feb. 9, 1968, 1,971/68
Int. Cl. C07c 137/00
U.S. Cl. 260—456 A                    3 Claims

ABSTRACT OF THE DISCLOSURE

The present disclosure relates to methods for the preparation of compounds of the formula

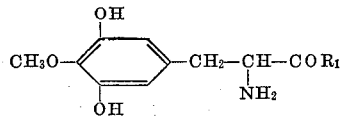

in which $R_1$ is hydroxyl, alkoxy, or a substituted or unsubstituted amino group, optical isomers (preferably the L-antipodes) thereof and pharmaceutically acceptable salts thereof. Such compounds are useful as hypotensive agents. The instant disclosure also includes certain novel intermediates which are useful in the preparation of the pharmaceutically useful compounds of Formula I.

RELATED APPLICATIONS

This application is a continuation-in-part of Ser. No. 684,623, filed in the United States on Nov. 21, 1967, now abandoned, inventors Balthasar Hedgedus and Paul Zeller.

SUMMARY OF THE INVENTION

The present invention relates to a process for the preparation of pharmaceutically useful phenyl alanine derivatives and to intermediates useful in this process. The pharmaceutically useful phenyl alanine derivatives prepared according to the invention are of the general formula

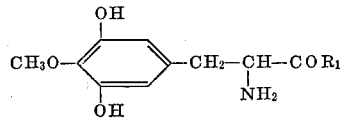

wherein $R_1$ is hydroxy, lower alkoxy or substituted or unsubstituted amino, optical isomers (preferably the L-antipodes) thereof and pharmaceutically acceptable salts of these compounds.

As use in Formula I and throughout the specification, lower alkoxy includes straight chain or branched chain alkoxy groups containing up to 6 carbon atoms, e.g., methoxy, ethoxy, n-propoxy, isopropoxy and the like. The amino group can be substituted with one or two straight or branched chain alkyl groups containing up to 6 carbon atoms, e.g., methyl, ethyl, isopropyl, etc. These alkyl groups can in turn be substituted with a hydroxy group. Furthermore, the two alkyl groups can be joined together to form a heterocyclic ring with the nitrogen atoms and, if desired, another hetero atom, e.g., piperidino or morpholino.

Compounds represented by Formula I possess valuable pharmaceutical properties, for example, each of the compounds is useful as a hypotensive agent.

When administered, for example, orally to hypertonic rats, they produce a hypotensive effect in single doses. By way of illustration the compound of Example 1 which has an $LD_{50}$ of >5,000 mg./kg. (p.o.) in rats and mice and can be administered to rats for 6 weeks in dosages of 2,000 mg./kg./day without showing any undesirable side effects such as sedative effects, exhibits hyptensive activity in the blood pressure test when administered at single oral doses of 50 mg./kg. to 200 mg./kg.

The hypotensive effects of this invention have hypotensive effects similar in many respects to those of α-methyldopa, which is well known for its therapeutic uses and properties. However, whereas α-methyldopa in addition to showing hypotensive activity on peripheral organs also exerts a corresponding sedative side-effect on the CNS (as evidenced, e.g., on the decrease of the catechol amine level in the brains of rats) the compounds of the present invention show a significantly lower sedative side-effect, as evidenced from measurements of the catechol amine level in the brains of rats given p.o. single doses of 50 mg./kg. to 200 mg./kg.

Thus the compounds of the present invention demonstrate a pattern of activity associated with potent hypotensives of known clinical efficacy while in addition showing a minimum of disturbing side effects. The compounds of the invention are therefore useful as hypotensive agents in the treatment of such pathological conditions as essential hypertonia.

The compounds of Formula I are white crystalline solids which have basic and acidic properties and can be conveniently prepared as such as in the form of their acid and base addition salts. Said salts are characteristically crystalline solids soluble in water, somewhat less soluble in polar solvents such as methanol, ethanol and the like and relatively insoluble in non-polar solvents such as benzene, ether and petroleum ether and the like. The free amino acid is also soluble in methanol.

The compounds of Formula I can be used in the form of conventional pharmaceutical preparations, for example, they or their salts can be used in admixture with a pharmaceutical organic or inorganic inert carrier which is suitable for enteral, percutaneous or parenteral application, e.g., water, gelatin, gum arabic, lactose, starch, magnesium stearate, talcum, vegetable oils, polyalkylene glycols, Vaseline and the like. The pharmaceutical preparations can be administered in solid form, e.g., as tablets, dragees, suppositories or capsules, in semi-solid form, e.g., as salves or in liquid form, e.g., as solutions, suspensions or emulsions. The preparations may be sterilized and/or contain additives such as preserving, stabilizing, wetting or emulsifying agents, salts for varying the osmotic pressure or buffers. They can also contain other therapeutically valuable substances.

The compounds of Formula I, in the form of the free acid, have amphoteric character and are readily soluble in water, acids and alkalis. Such compounds can form salts with acids and alkalis, e.g., salts can be formed by the carboxyl groups with bases and by the amino group with acids. These compounds of Formula I also form esters with lower aliphatic alcohols, preferably methanol or ethanol. Such compounds can also be converted into amides.

As representative examples of the preferred compounds of Formula I there can be named:

DL-3,5-dihydroxy-4-methoxyphenyl-alanine
DL-3,5-dihydroxy-4-methoxyphenyl-alanine ethyl ester
DL-3,5-dihydroxy-4-methoxyphenyl-alanine methyl ester
DL-3,5-dihydroxy-4-methoxyphenyl-alanine amide and
DL-3,5-dihydroxy-4-methoxyphenyl-alanine dimethylamide, as well as the L isomers of these compounds.

The compounds of Formula I are obtained as racemates which can be resolved by conventional means. For example, esters may be resolved with optically active acids, e.g., tartaric acid, or salts may be formed with optically active bases, e.g., quinine or brucine. The D- and L-forms can then be separated, usually by solubility differences.

The L isomers prepared according to the present invention are particularly interesting; specifically L-3,5-dihydroxy-4-methoxyphenyl-alanine.

One process embodiment of the present invention for the preparation of the phenyl alanine derivatives of Formula I is characterized in that it comprises hydrolyzing a compound of the general formula

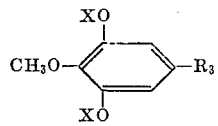

wherein X represents an acyl group or the group $$R_2O-CR_3R_7-$$

in which $R_2$ is alkyl or phenyl-alkyl, $R_3$ is hydrogen, alkyl, phenyl-alkyl or, together with $R_2$, alkylene, $R_7$ is hydrogen or alkyl, and $R_4$ is one of the groups

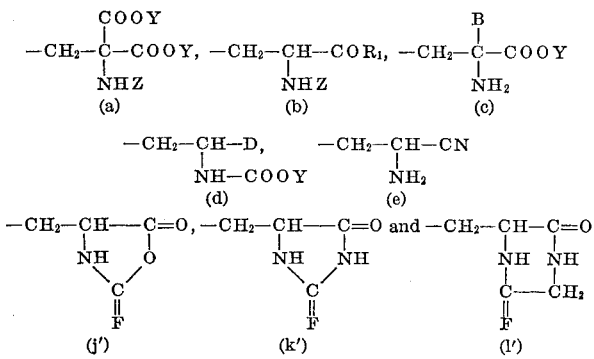

in which $R_1$ has the above meaning, Y is alkyl, Z is hydrogen or acyl, B is alkanoyl, D is carbalkoxy or cyano and F is oxygen or sulphur, or reducing a compound of the general formula

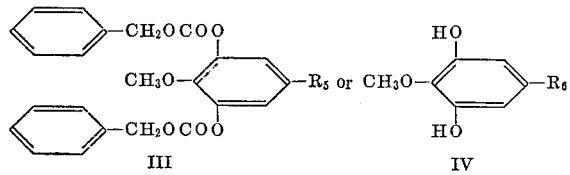

wherein $R_5$ is one of the groups

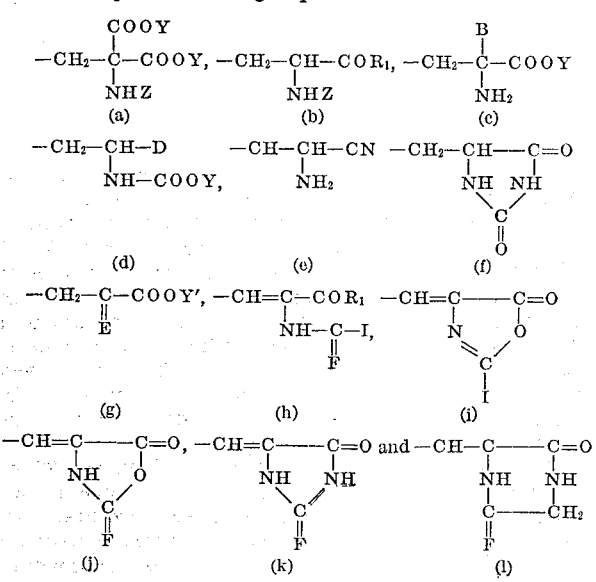

wherein $R_1$ has the above meaning, Y is alkyl, Y' is hydrogen or alkyl, Z is hydrogen or acyl, B is alkanoyl, D is carbalkoxy or cyano, E is hydroximino or phenylhydrazono, F is oxygen or sulphur and I is alkyl, phenylalkyl or alkyl phenyl, and $R_6$ is one of the groups

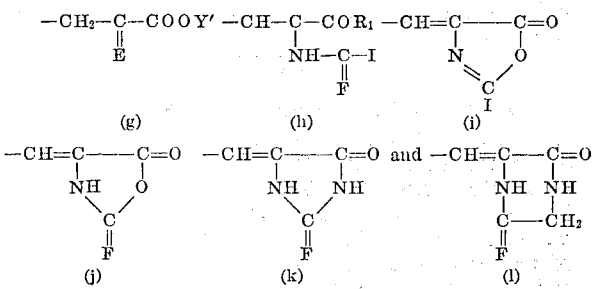

wherein $R_1$ has the above meaning, Y' is hydrogen or alkyl, E is hydroximino or phenylhydrazono, F is oxygen or sulphur and I is alkyl, phenyl, phenyl alkyl or alkyl phenyl, if necessary a group $R_4$, $R_5$ or $R_6$ into the alanyl group or into an ester or an amide thereof and, in an optional sequence, if desired, esterifying or amidating a free carboxy group, if desired hydrolyzing a carbalkoxy or carbamoyl group, if desired, converting a resulting product into a salt, isomerizing a D isomer obtained and/or if desired, splitting a racemate obtained into its optical isomers and isolating the L isomer.

The protecting groups X present in the starting compounds of Formula II can, for example, be acyl groups. Included in the term acyl groups are the following exemplary groups: carboxylic acyl groups, such as alkanoyl, benzoyl, phenyl alkanoyl, carbalkoxy or carbophenylalkoxy; as well as substituted sulfonyl groups, such as alkyl sulfonyl, phenyl sulfonyl or phenyl alkyl sulfonyl. The aliphatic groups present in the above acyl groups are straight or branched chained and can contain up to 6 carbon atoms, e.g., formyl, acetyl, propionyl, isobutyryl, caproyl, phenyl acetyl, carbomethoxy, carboisopropoxy, carbobenzoxy, carbophenethoxy, methyl sulfonyl (mesyl), ethylsulfonyl, isopropylsulfonyl, n-hexylsulfonyl and benzylsulfonyl Preferred are benzoyl, acetyl, phenylsulfonyl, mesyl and carbobenzoxy. The phenyl residue of the acyl group can be, if desired, substituted, e.g., by alkyl or alkoxy groups having up to 6 carbon atoms or by halogen.

The protective groups X can also include groups of the general formula $R_2O-CR_3R_7-$, wherein $R_2$ represents alkyl or phenyl alkyl, $R_3$ represents hydrogen, alkyl, phenyl alkyl or, together with $R_2$, alkylene and $R_7$ represents hydrogen or alkyl, The (cyclo)-aliphatic members of the group $R_2O-CR_3R_7-$, are preferred. The alkyl groups present can be straight or branched chained and may contain preferably up to 6 carbon atoms. Alkylene groups are straight chained and contain preferably 3 or 4 carbon atoms. Exemplary of the $R_2O-CR_3R_7-$ group are: methoxy-methyl, 1-ethoxy-ethyl, 1-isopropoxy-ethyl, 1-methoxy-1-methyl-ethyl, tetrahydrofuranyl, tetrahydropyranyl. Particularly preferred are methoxy-methyl, 1-ethoxyethyl and tetrahydropyranyl.

The alkyl groups Y and Y' are either straight or branched chained and can contain up to 6 carbon atoms, e.g., isopropyl, n-hexyl or, particularly, methyl or ethyl. Examples of acyl groups Z include alkanoyl, benzoyl or phenyl alkanoyl, wherein the alkanoyl residue can contain up to 6 carbon atoms, e.g., propionyl, isobutyryl, caproyl, phenyl acetyl or, particularly, acetyl or formyl. The phenyl residue of the acyl group can be substituted, e.g., by alkyl or alkoxy with up to 6 carbon atoms, or by halogen. Acyl groups Z can also be the following: carbalkoxy and carbophenyl alkoxy, whereby the aliphatic group is straight or branched chained and can contain up to 6 carbon atoms, e.g., carbomethoxy, carboisopropoxy, carbophenethoxy or, preferably, carbobenzoxy. Alkanoyl groups B and carbalkoxy groups D are straight or branched chained and can contain up to 6 carbon atoms. Alkyl groups present in group I are also straight or branched chained and can contain up to 6 carbon atoms.

The starting compounds of the general formula

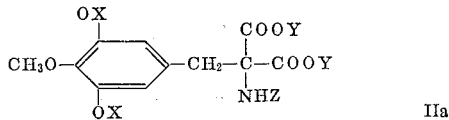

wherein X is an acyl residue or the $R_2O$—$CR_3R_7$— group, in which $R_2$ is alkyl or phenyl alkyl, $R_3$ is hydrogen, alkyl, phenyl alkyl or, together with $R_2$, alkylene, $R_7$ is hydrogen or alkyl, Y is alkyl and Z is hydrogen or acyl, can, for example, be prepared in the following manner:

When a starting compound of Formula IIa in which X is a carboxylic acyl group is to be prepared, the para hydroxy group of a 3,4,5-trihydroxybenzoic acid ester can be reacted in a manner known per se with a methylating agent, e.g., with dimethyl sulfate. After the isolation of 3,5 - dihydroxy - 4 - methoxy benzoic acid ester which is formed, this compound is saponified, e.g., with aqueous sodium hydroxide solution. The acid obtained is subsequently reacted with the desired acid chloride or acid anhydride in the presence of a base, e.g., in the presence of aqueous sodium hydroxide solution, pyridine or triethyl amine to form the corresponding 3,5-bis-(acyloxy)-4-methoxy-benzoic acid. The acid obtained is reduced to the corresponding benzyl alcohol by the action of a suitable reducing agent, preferably diborane in a solvent, e.g., ethylene glycol dimethyl ether or ethylene glycol monomethyl ether. The same alcohol can also be obtained by acylating, in a manner described above, 3,5-dihydroxy-4-methoxy-benzaldehyde and reduction of the 3,5-acylated compound obtained, e.g., by reaction with sodium borohydride in dioxan-water at a temperature of 0°–40° C. The alcohol formed is reacted with a halogenating agent, e.g., with phosphorous trichloride or thionyl chloride in an inert solvent such as ether, benzene or methylene chloride, to form a compound of Formula VIa below, in which X is a carboxylic acyl group and A is halogen. It is also possible to treat the sodium salt of the alcohol form above in an inert solvent, such as tetrahydrofuran, benzene or toluene with a sulfonylating agent, e.g., methane sulfonyl chloride or toluene sulfonyl chloride to yield a compound of the formula

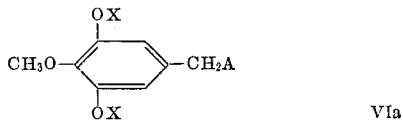

wherein X is a carboxylic acyl group and A is an alkyl- or aryl-sulfonyloxy group.

In order to prepare a starting compound wherein X is a substituted sulfonyl group, the 3,5-dihydroxy-4-methoxy benzoic acid ester obtained above is reacted, e.g., with a substituted sulfonyl chloride in the presence of a base, such as aqueous caustic soda, potassium carbonate or pyridine. The ester protected in the 3,5-position so obtained is subsequently subjected to acid hydrolysis, preferably in a mixture of aqueous sulfuric acid and glacial acetic and at the boiling point of the reaction mixture, to form the corresponding acid. The same acid can also be obtained by trisulfonylation of a 3,4,5-trihydroxy benzoic acid ester, splitting off the middle protecting group by means of treatment with liquid ammonia, methylation of the 4-OH group and saponification of the ester group. The acid so formed is thereafter, as in the above mentioned reaction involving compounds having carboxylic acyl protecting groups, converted into a compound of the Formula VIa, in which X represents a substituted sulfonyl group.

In order to prepare a starting compound in which X is the $R_2O$—$CR_3R_7$— group, the 3,5 - dihydroxy-4-methoxy-benzoic acid ester obtained above can be reacted with a compound of the formula $R_2OCH_2Cl$ or $R_2OCR_7$=$R'_3$. $R_2$ and $R_7$ therein have the above meanings and $R'_3$ represents an alkylidene, phenyl-alkylidene or, together with $R_2$, an alkyleneidene group. Exemplary of such compounds are: chloromethyl methyl ether, vinyl ethyl ether, vinyl isopropyl ether, methyl isopropenyl ether, dihydrofuran and dihydropyran. Additionally, 3,4,5-trihydroxybenzoic acid ester can be used as a reactant, whereby the protective groups enter selectively into the 3- and 5-positions. The protected ester so obtained is subsequently O-methylated in the 4-position. The 4-O-methylated ester so obtained is subsequently reduced with lithium aluminum hydride in a suitable solvent, preferably in ether, at reflux temperature. The sodium salt of the alcohol so formed is reacted in an inert solvent such as tetrahydrofuran, benzene or toluene with a sulfonylating agent, e.g., methane sulfonyl chloride or toluene sulfonyl chloride to yield a compound of the Formula VIa, in which X is a $R_2O$—$CR_3$—$R_7$— group and A is an alkyl- or arylsulfonyloxy group, wherein $R_2$, $R_3$ and $R_7$ have their above meanings.

In order to prepare a starting compound of the Formula IIa wherein Z is acyl, the compound of Formula VIa is subsequently condensed with a compound of the general formula

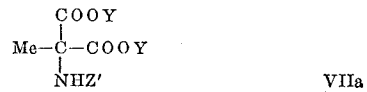

wherein Me is an alkali metal, Y is alkyl and Z' is acyl.

Of the compounds of Formula VIIa, the sodium salt of an acyl amino malonic acid diethyl- or dimethylester is preferred.

The condensation is preferably carried out in an organic solvent such as methanol, ethanol, benzene, dimethyl formamide or dimethyl sulfoxide. It usually proceeds exothermically and is carried to conclusion by heating. When dimethyl formamide, dimethyl sulfoxide or an alkanol is used as the solvent, the reaction product can be precipitated by the addition of water. If benzene is used, the reaction product can be freed from by-products by washing with water and isolated by evaporation and, where necessary, purified by recrystallization. There is obtained a starting compound of Formula IIa, wherein Z is acyl.

When a starting compound of the Formula IIa, in which Z represents hydrogen is required, the halogenide or sulfonate of the Formula VIa can be reacted with an alkali metal salt of a malonic ester in an inert solvent, e.g., in an alkanol, in benzene or dimethyl formamide at elevated temperature in a manner known per se. The so-obtained compound of formula

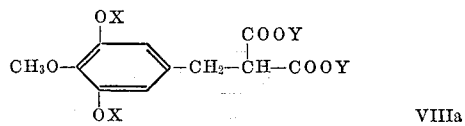

wherein X is an acyl group or the $R_2OCR_3R_7$— group in which $R_2$ is alkyl or phenyl alkyl, $R_3$ is hydrogen, alkyl, phenyl alkyl or, together with $R_7$, alkylene, $R_7$ is hydrogen or alkyl and Y is alkyl, can subsequently be reacted with bromine or chlorine in an inert solvent, e.g., in benzene or methylene chloride. The resulting compound of the formula

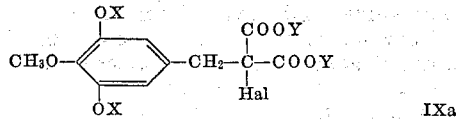

wherein X and Y have the above meanings and Hal is bromine or chlorine, can be converted into the required starting compound of the Formula II, in which is hydrogen by treatment with ammonia.

The starting compound of the formula

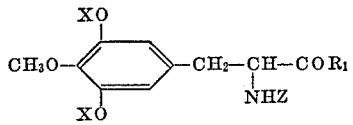
IIb wherein X is an acyl group or the R₂O—CR₃R₇— group in which R₂ is alkyl or phenyl alkyl, R₃ is hydrogen, alkyl, phenyl alkyl or, together with R₂, alkylene, R₇ is hydrogen or alkyl, R₁ is hydroxy, alkoxy or substituted or unsubstituted amino and Z is hydrogen or acyl, can e.g. be prepared as follows:

Compounds of Formula IIb, in which X is the R₂O—CH₃R₇ group and R₁ is hydroxy, can e.g. be obtained by treatment of a compound of the Formula IIa with ethanolic sodium hydroxide solution at a temperature between room temperature and about 100° C. By neutralization or acidification of the reaction mixture one of the carboxy groups obtained is decarboxylated and there is obtained a starting acid of Formula IIb.

Compounds of Formula IIb, wherein X is acyl and Z is hydrogen are conveniently obtained from the compounds of Formula IIa, and which X is acyl and Z is hydrogen, by hydrolysis with the aid of aqueous mineral acid at a temperature between room temperature and the boiling point of the reaction mixture.

Compounds of Formula IIb, in which X and Z both are acyl, are e.g. obtained by treatment of the correspondingly protected 3,5-dihydroxy-4-methoxy-benzaldehyde with a glycine derivative of the formula

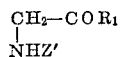
VIb wherein R₁ is hydroxy, alkoxy or substituted or unsubstituted amino and Z' is acyl, whereby the correspondingly substituted benzylidene glycerine derivative is obtained, which can be converted into starting compound of Formula IIb, wherein X and Z both are acyl, by means of catalytic hydrogenation in the presence of palladium.

The acids of Formula IIb obtained in a manner described above can be esterified in a known manner with lower alkanols and can subsequently be amidated with ammonia or with a mono- or disubstituted amine.

The starting compounds of the general formula

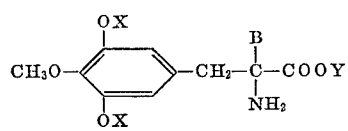
IIc wherein X is an acyl group or the R₂O—CR₃R₇— group in which R₂ is alkyl or phenyl alkyl, R₃ is hydrogen, alkyl, phenyl alkyl or, together with R₂, alkylene, R₇ is hydrogen or alkyl, Y is alkyl and B is alkanoyl, can e.g. be prepared by reacting, in a manner known per se, a corresponding 3,5-position protected 3,5-dihydroxy-4-methoxybenzyl halogenide or a corresponding sulfonyloxy derivative with an alkali metal salt of an alkanoyl acetic acid ester, whereafter the formed, substituted alkanoyl acetic acid ester is reacted with bromine or chlorine in an inert solvent, e.g. benzene or methylene chloride at a temperature of between room temperature and the boiling point of the reaction mixture. The hydro-halic acid formed is removed by shaking with water. The resulting α-halogen-β-keto acid ester of the formula

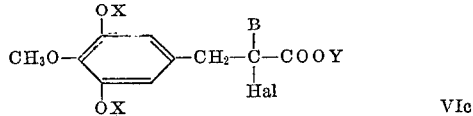
VIc wherein X, Y and B have the above meanings and Hal is bromine or chlorine, which is obtained through concentration of the solution, can be further processed without further purification.

The halogen atom of the ester of the Formula VIc can be replaced by amino through treatment with ammonia or with a reactive derivative of ammonia, e.g., by treatment with potassium phthalimide or with hexamethylene tetramine. A preferred embodiment consists of reacting a bromo substituted ester of the Formula VIc with potassium phthalimide in a suitable solvent such as methanol, ethanol, dimethyl formamide or benzene, at a temperature range of between room temperature and the boiling point of the reaction mixture. The phthalimido group is preferably hydrolyzed off by heating with hydrazine in an alkanol at a temperature of up to the boiling point of the reaction mixture. There is obtained a starting compound of the Formula IIc.

The starting material of the general formula

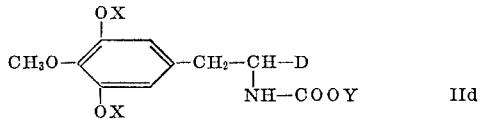
IId wherein X is an acyl residue or the R₂O—CR₃R₇ group in which R₂ is alkyl or phenyl alkyl, R₃ is hydrogen, alkyl, phenyl alkyl or, together with R₂, alkylene, R₇ is hydrogen or alkyl, Y is alkyl and D is carbalkoxy or cyano, can e.g. be prepared by reaction of a halogenide of sulfonate of the Formula VIa in a manner known per se with an alkali metal salt of a malonic ester or cyano acetic acid ester in a suitable solvent, e.g., in an alkanol, in benzene or dimethyl formamide, at elevated temperature, preferably at the boiling point of the reaction mixture. Subsequently, impurities are removed by shaking with water, and the desired substituted phenyl acetic acid derivative of the formula

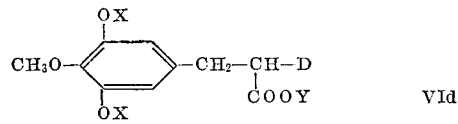
VId wherein X, Y and D have the above meanings, can thereafter be isolated by evaporation.

The compounds of the Formula VId can be converted into the corresponding acid hydrazides by treatment with hydrazine. When these acid hydrazides are treated with sodium nitrite they convert into the corresponding acid azides. The latter can be converted into the corresponding acid isocyanates by heating in an inert solvent and the so-formed isocyanate can, by the addition of alkanols, be converted into the corresponding carbamic acid derivatives of the Formula IId.

The starting material of the general formula

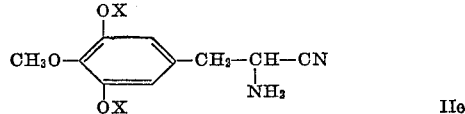
IIe wherein X is an acyl residue, can e.g. be prepared by reacting a halogenide or sulfonate of the Formula VIa in a manner known per se with an alkali metal salt of a malonic ester or cyano acetic acid ester in an inert solvent, e.g., in an alkanol, in benzene or dimethyl formamide at elevated temperature, preferably at the boiling point of the reaction mixture, whereafter the so-formed α-cyano [or carbalkoxy]-β-[3,5-bis-(acyloxy)-4-methoxy-phenyl]-propionic acid ester is converted into the corresponding dihydrazide by treatment with an excess of hydrazine, with heating. This dihydrazide is converted in the presence of an alkanol, with heating, via the corresponding diazide and diisocyanate, into the corresponding dicarbamate. This dicarbamate can be saponified, e.g., with a mineral acid, with heating, to yield 3,5-bis-(acyloxy) - 4-methoxy-phenyl-acetaldehyde. This aldehyde can be converted into its bisulfite derivative and treated with an alkali metal cyanide or with hydrocyanic acid to yield the α-hydroxy nitrile of the formula

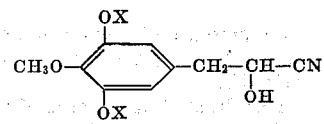
VIe wherein X is an acyl residue.

This compound can be converted into the corresponding amino nitrile of the Formula IIe by treatment with ammonia, suitably in aqueous solution and in excess. The formation of nitrile can be accelerated by heating.

A starting compound of the Formula IIe, wherein X is the R₂O—CR₃R₇— group can be obtained by treatment of an isocyanate of the formula

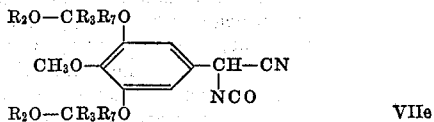
VIIe wherein R₂, R₃ and R₇ have the above meanings, with aqueous sodium hydroxide solution and subsequent acidification.

The starting compounds of formula

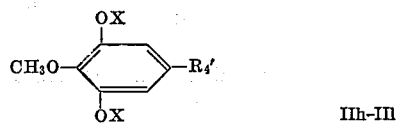
IIh–II wherein X is an acyl residue or the R₂O—CR₃R₇— group in which R₂ is alkyl or phenyl alkyl, R₃ is hydrogen, alkyl, phenyl alkyl or, together with R₂, alkylene, R₇ is hydrogen or alkyl and R₄' is one of the groups

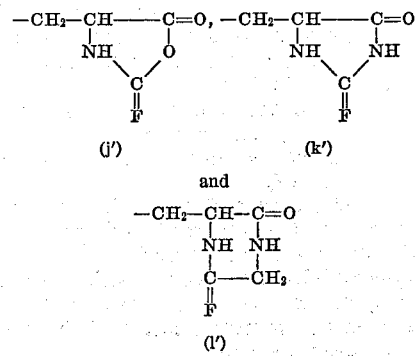

in which F represents oxygen or sulphur, can e.g. be prepared by oxidation of a 3,5-dihydroxy-4-methoxy-benzyl alcohol correspondingly protected in the 3,5-position in a manner known per se with the aid of manganese dioxide to yield the corresponding benzaldehyde. The same benzaldehyde can be obtained by oxidation of a halogenide of the Formula VIa according to Sommelet in the presence of urotropine. Further methods for the preparation of 3,5-position protected 3,5-dihydroxy-4-methoxy-benzaldehydes are illustrated in Examples 1 and 6 hereafter. The correspondingly 3,5-protected 3,5-dihydroxy-4-methoxy-benzaldehyde so obtained is subsequently condensed with hydantoin (or with 2-thiohydantoin) with loss of water, e.g., by heating, if desired, in the presence of a catalyst, e.g. in the presence of sodium acetate or toluene sulfonic acid to form the correspondingly substituted benzylidene-(thio)-hydantoin. The reaction proceeds suitably in a solvent, e.g., methanol, ethanol, glacial acetic, acetic acid anhydride or piperidine, with heating. If instead of hydantoin, oxazolidin-2,5-dione (or -2-thion-5-one) are formed. The benzylidene compounds so obtained can e.g. be reduced to the starting compounds of the Formulae IIj', IIk' and III' by treatment with sodium amalgam.

The starting compounds of the Formulae IIb, IIc, IId, IIe, IIf, IIj', IIk' and III' can be employed as racemates or as optically active compounds. The optical antipodes can be obtained by separation in a manner known per se. Basic compounds of Formula II can be resolved, e.g., with the aid of an optically active acid, such as tartaric acid; acid compounds of the Formula II can be resolved with the aid of an optically active base, such as quinine, brucine or tyrosine hydrazide. A D isomer can be racemized according to methods known per se and the racemate obtained can, if desired, be resolved into its optically active isomers. As an example, a 3,5-position substituted D-3,5-dihydroxy-4-methoxy-phenyl-alanine can be treated with acetic anhydride at a temperature between room temperature and the boiling point of the reaction mixture. The product, 3,5-position substituted DL-2-methyl-4-(3,5 - dihydroxy-4-methoxy-benzyl)-2-oxazolin-5-on can be converted by hydrolysis, while retaining the protecting groups in the 3,5-position, into the 3,5-protected DL-3,5-dihydroxy-4-methoxy-phenyl-alanine. This compound can be resolved into its optical antipodes as described above.

The hydrolysis of compounds of the general formulae of the present invention suitably proceed at a temperature between room temperature and the boiling point of the reaction mixture, preferably in the vicinity of the boiling point. The hydrolysis may be conducted in the presence of a solvent, preferably in the presence of water. One can also work under pressure, which in turn means that temperatures between room temperature and about 200° C. may then be utilized.

Substituted sulfonyloxy residues X present in starting materials of Formula II are split off by basic hydrolysis. This proceeds suitably through treatment with alkali, e.g., with aqueous sodium or potassium hydroxide, suitably in a concentration of 5–30 percent, preferably 10–20 percent, or by treatment with aqueous, preferably 3 N to 6 N barium hydroxide solution. Protecting groups of the formula R₂O—CR₃R₇— are replaced by hydrogen atoms with the aid of acidic hydrolysis. This acidic hydrolysis is suitably carried out with the aid of mineral acid, e.g., with the aid of aqueous sulfuric acid or aqueous hydrochloric acid, at a concentration of from about 2 N to about 6 N. Carboxylic acyl protecting groups can be split off by basic as well as also by acidic hydrolysis, substantially as described above.

In the hydrolysis of a starting compound of Formula IIa the two ester groups Y are hydrolytically cleaved and, in acidic medium, one of the two resulting carboxy group is decarboxylated. Acyl groups Z present in compounds of Formulae IIa and IIb are split off in the acidic hydrolysis. Alkanoyl groups B and the ester group Y of compounds of Formula IIc can be split off by treatment with strong alkali and subsequent neutralization with mineral acid. Compounds of Formula IId are preferably hydrolyzed in an acidic medium. Cyano groups D present in compounds of Formula IId are saponified in the hydrolysis. At the same time, one of the two carboxy groups formed is split off. The cyano group of amino nitriles of Formula IIe is converted into the carboxy group by means of acidic or basic hydrolysis. The hydrolysis of the starting compounds of Formulae IIj', IIk' and III' causes a splitting of the heterocyclic rings. This is effected preferably by treatment with strong mineral acid such as 6 N aqueous sulfuric acid.

After the above described hydrolysis of starting compounds of Formulae IIb, IIc, IIe, IIj', IIk' and III' and after hydrolysis and subsequent decarboxylation of starting materials of Formulae IIa and IId, there is obtained 3,5-dihydroxy-4-methoxy-phenyl-alanine.

The starting compounds of the general formula

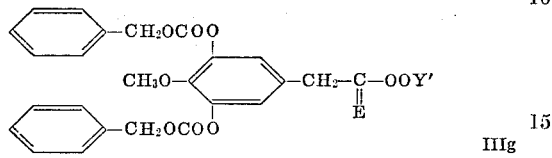

IIIg wherein Y' is hydrogen or alkyl and E is hydroximino or phenylhydrazono, can e.g. be prepared by reacting a 3,5-bis-(benzoyloxycarbonyloxy)-4-methoxy-benzyl-malonic acid ester with an alkyl nitrite in the presence of an alkanol and of a base, e.g. in the presence of an alkali metal alcoholate at a temperature range between room temperature and the boiling point of the reaction mixture. With the loss of one carbalkoxy group there is formed the oxime of the substituted phenyl pyruvic acid ester of Formula IIIg.

If instead of the above mentioned alkyl nitrite a phenyldiazonium salt, such as phenyldiazonium chloride, is employed, the corresponding phenylhydrazono derivative of Formula IIIg is obtained.

The oxime of Formula IIIg can also be obtained by condensation of 3,5-bis-(benzyloxycarbonyloxy)-4-methoxy-benzaldehyde with rhodanine, cleaving the result-5-(3,5-bis-(benzyloxycarbonyloxy)-4-methoxy-benzylidene)-rhodanine with diluted alkali and reacting the so-obtained 1-thioxo-2-(3,5-bis-(benzyloxycarbonyloxy)-4-methoxy-phenyl)-propionic acid with hydroxylamine in alcoholic aqueous solution.

Resulting esters of Formula IIIg can, in a manner known per se, be converted into the corresponding acids of Formula IIIg by employing acidic or basic hydrolysis.

The starting compounds of formula

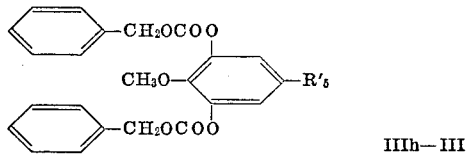

IIIh—III wherein $R_5'$ is one of the radicals

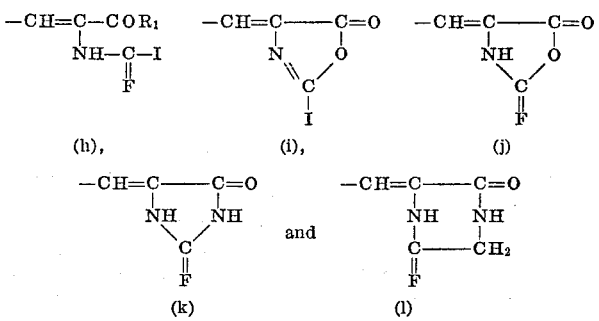

wherein F is oxygen or sulphur and I is alkyl, phenyl, phenyl alkyl or alkyl phenyl, can e.g. be prepared by oxidation of 3,5-bis-(benzyloxycarbonyloxy) - 4 - methoxy - benzylalcohol, as described above, to yield the corresponding benzaldehyde. This is e.g. heated with hydantoin (or with 2-thiohydantoin), as described above, to yield the correspondingly substituted hydantoin or (thio)-hydantoin of Formula IIIk.

If in the above reaction, instead of hydantoin, a compound of the formula

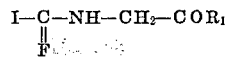

oxazolidin-2,5-dione (or -2-thion-5-one) or piperazin-2,5-dione (or -2-thion-5-one) is used, there is obtained a compound of Formulae IIIh, IIIj or IIIl. If the reaction between 3,5-bis-(benzyloxycarbonyloxy)-4-methoxy-benzaldehyde and an acyl amino acid of the formula

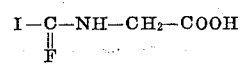

is carried out in the presence of acetic acid anhydride and sodium acetate with heating, there is obtained a compound of Formula IIIi.

The preparation of the starting material of the Formulae IIIa–IIIf is described above under the preparation of the compounds of the Formulae IIa–IIe and IIk'.

The starting compounds of Formulae IIIb–IIIf can be employed as a racemate or as optically active compounds. The optical antipodes can be obtained by separation in a manner known per se. Basic compounds of Formula III can be resolved, e.g. with the aid of an optically active acid, such as tartaric acid; acidic compounds of Formula III can be resolved with the aid of an optically active base such as quinine, brucine or tyrosine hydrazide. A D isomer obtained can be racemized according to methods known per se an the racemate obtained can, if desired, be resolved into its optically active isomers as described above.

The compounds of the general formula

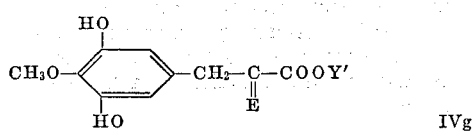

IVg wherein Y' is hydrogen or alkyl and E is hydroximino or phenylhydrazono, can e.g. be prepared by reacting a (3,5-diacetoxy-4-methoxybenzyl)-malonic acid ester with an alkyl nitrite in the presence of an alkanol and of a base, e.g., in the presence of an alkali alcoholate, at a temperature range lying between room temperature and the boiling point of the reaction mixture. With the loss of one carbalkoxy group and of the acetyl groups in 3- and 5-position there is formed the oxime of the substituted phenyl pyruvic acid ester of Formula IVg.

If instead of the above mentioned alkyl nitriate, a phenyldiazonium salt, such as the phenyldiazonium chloride, is employed, the corresponding phenylhydrazono derivative of Formula IVg is obtained.

The oxime of Formula IVg can also be obtained by condensation of 3,5-diacetoxy-4-methoxy-benzaldehyde with rhodanine, cleaving of the resulting 5-(3,5-diacetoxy-4-methoxy-benzylidene)-rhodanine with diluted alkali and reacting the so-obtained 1-thioxo-2-(3,5-dihydroxy-4-methoxy-phenyl) propionic acid with hydroxylamine in alcoholic aqueous solution.

Resulting esters of Formula IVg can, in a manner known per se, be converted into the corresponding acid on the Formula IVg by employing acidic or basic hydrolysis.

The starting compounds of the formula

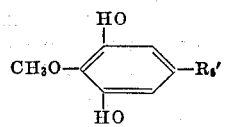

IVh–IVl wherein $R_6'$ is one of the groups

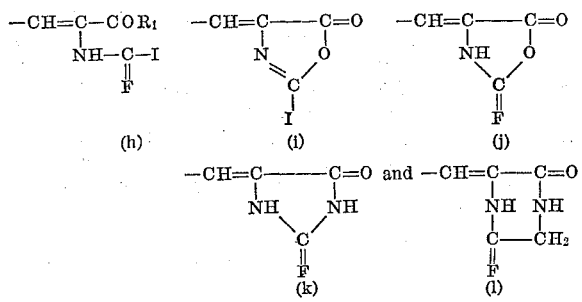

wherein F is oxygen or sulphur and I is alkyl, phenyl, phenyl alkyl or alkyl phenyl, can e.g. be prepared by heating 3,5-dihydroxy-4-methoxy-benzaldehyde with hydantoin (or with 2-thiohydantoin) in acetic acid anhydride with the addition of sodium acetate, with simultaneous loss of water and 3,5-acetylation the correspondingly substituted benzylidene hydantoin is formed. This compound is converted into the starting material of Formula IVk by treatment with dilute sodium hydroxide solution. Starting compounds of Formulae IVh, IVj and IVl are obtained by reaction of 3,5-dihydroxy-4-methoxy-benzaldehyde with a compound of formula

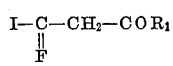

oxazolidin-2,5-dione (or -2-thion-5-one) or piperazin-2,5-dione (or -2-thion-5-one). A starting compound of Formula IVi can be obtained by reaction of 3,5-dihydroxy-4-methoxy-benzaldehyde with an acylamino acid of the formula

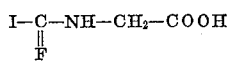

in the presence of acetic acid anhydride and sodium acetate with heating, and subsequent treatment with concentrated aqueous ammonia.

The reduction of the compounds of Formulae III and IV, which is within the scope of the present invention, is expediently carried out between room temperature and about 80° C. at atmospheric or at higher pressures. As reducing agent, there can be employed e.g. catalytically activated hydrogen. When employing palladium, Raney-nickel or platinum as catalysts, the carbobenzoxy groups which may be present in the 3,5-position, as well as also carbobenzoxy groups Z are split off. At the same time group E is reduced to the amino group, and the carbon-carbon double-bound present in the groups $(h)-(l)$ is hydrogenated. The azlactone group $(i)$ is split up with the formation of the group

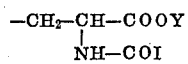

If, as reducing agent, hydrogen and Raney-cobalt or a complex metal hydride, such as sodium or lithium borohydride or sodium amalgam is employed, any carbobenzoxy groups present are maintained. These groups can subsequently be hydrogenolytically cleaved off as described above.

Of the compounds obtained after the reduction which have the general formula

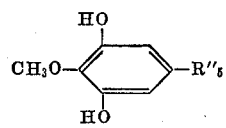

wherein $R''_5$ is one of the groups

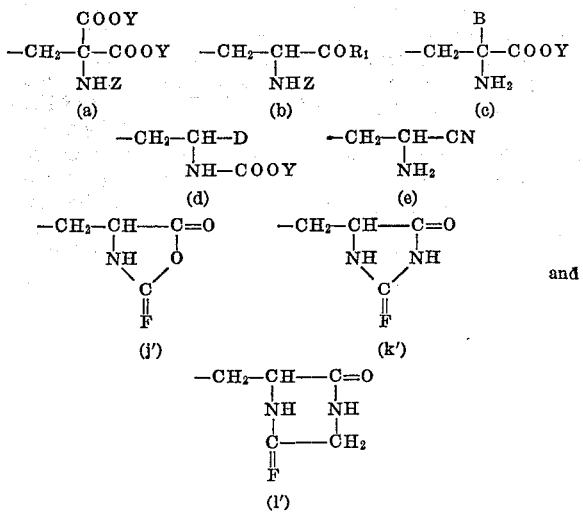

and Y, Z, $R_1$, B, D and F have the meanings given above, those of Formula Vb in which Z is hydrogen are already end products of Formula I, and they can be used as such. The remaining compounds of Formula V must, in order to be converted into the corresponding phenyl alanine derivatives of Formula I, be subjected to hydrolysis. In this hydrolysis the temperature used is between room temperature and the boiling point of the reaction mixture, preferably in the vincinity of the boiling point. For example, the resulting compound of Formula Va is hydrolyzed with acid, e.g., with aqueous sulfuric acid or hydrochloric acid at a concentration of about 2 N to yield the corresponding amino acid. In doing this, the two ester groups are hydrolytically cleaved and simultaneously one of the two carboxy group so formed is decarboxylated. The acyl group Z is also split off in the acid hydrolysis. If e.g. hydrochloric acid is employed, there is obtained the hydrochloride of the corresponding amino acid of Formula I, i.e., the hydrochoride of 3,5-dihydroxy-4-methoxy-phenyl-alanine.

Resulting compounds of Formula Vb, wherein Z is acyl, are preferably hydrolyzed in an acidic medium. There is obtained 3,5-dihydroxy-4-methoxy-phenyl-alanine.

Resulting compounds of Formula Vc can be converted into 3,5-dihydroxy-4-methoxy-phenyl-alanine with strong alkali with simultaneous splitting off of the alkanoyl group B and the ester group Y.

Resulting compounds of Formula Vd are preferably hydrolyzed in an acidic medium. Cyano groups D present in the Formula Vd are saponified in the hydrolysis. At the same time, the carbalkoxy group bound to the nitrogen atom is split off. There is obtained 3,5-dihydroxy-4-methoxy-phenyl-alanine.

The cyano group of resulting amino nitriles of Formula Ve is preferably converted into the carbamoyl group by means of acidic hydrolysis or, under energetic acidic hydrolysis, the cyano group is converted into the carboxy group.

The hydrolysis of resulting compounds of the Formulae Vj', Vk' and Vl' causes a splitting of the heterocyclic rings. There is obtained a corresponding amino acid of Formula I, i.e., 3,5-dihydroxy-4-methoxy-phenyl-alanine.

The 3,5-dihydroxy-4-methoxy-phenyl alanine, which is obtained after hydrolysis, can be esterified with lower alkanols and, if desired, subsequently be amidated with ammonia or with a primary or secondary amine, according to methods know per se. The esterification process proceeds particularly well in the presence of an acidic catalyst, e.g., in the presence of hydrogen chloride, p-toluene sulfonic acid, sulfuryl chloride or thionyl chloride.

The free acids are amphoteric. With bases the carboxy group can form the corresponding salts. On the other hand, the amino group is capable of forming acid addition salts.

Racemates of compounds of Formula I which are obtained according to the process of the invention can be separated into the optical antipodes according to methods knokn per se. Esters and amides may be separated for example with the aid of an optically active acid, such as tartaric acid or camphorsulfonic acid. The L acid of Formula I, which is obtainable after the splitting of the amide, can, if desired, be converted into corresponding L-amides by means of amidating in the manner described above. DL-3,5-dihydroxy-4-methoxy-phenyl-alanine can be acylated at the amino group and the compound obtain can be resolved into its optical antipodes with the aid of an optically active base, such as quinine, brucine, tyrosine hydrazide, abietyl amine, D- or L-phenethyl amine. After hydrolytic splitting off of the N-acyl group, preferably in an acidic environment, there is obtained pure L-3,5-dihydroxy-4-methoxy-phenyl alanine.

A D isomer obtained can be racemized according to methods known per se and the racemate is obtained, if desired, can be resolved into its optically active isomers. By repeated racemizing and separation of the optical antipodes, the D isomer can be converted into the preferred L isomer, which is isolated. As an example, D-3,5-dihydroxy-4-methoxy-phenyl-alanine can be treated with acetic acid anhydride at a temperature between room temperature and the boiling point of the reaction mixture. The formed DL - 2 - methyl-4-(3,5-diacetoxy-4-methoxy-phenyl)-2-oxazolin-5-one can be converted into DL-3,5-dihydroxy-4-methoxy-phenyl-alanine by means of acidic or basic hydrolysis, i.e., by treatment with aqueous mineral acid or with aqueous alkali hydroxide solution. The DL-3,5-dihydroxy-4-methoxy-phenyl-alanine formed can, in the manner described above, be resolved into its optical antipodes and the preferred L isomer isolated.

The compounds of the invention are usually obtained in sufficiently pure form to make further purification superfluous. Inorganic impurities which may be present can be removed with the aid of weakly acidic ion exchangers.

The phenyl alanine derivatives prepared according to the instant invention possess hypotensive properties. In addition, they lower the catechol amine content of the brain considerably less than in peripheral organs. The central nervous system is therefore influenced only to a minor extent. This results in the advantage that disturbing sedative side effects are decreased when the compounds of the Formula I are used, e.g., as hypotensive agents.

The compounds according to the invention can be used as medicaments, e.g., as hypotensive agents. They may be used in the form of pharmaceutical preparations, which contain the compounds, or salts thereof, in admixture with a pharmaceutical organic or inorganic, solid or liquid carrier suitable for enteral, e.g., oral, percutaneous or parenteral administration. For making up the preparation there may be employed substances which do not react with the compounds, such as water, gelatine, gums, lactose, starches, magnesium stearate, talc, vegetable oils, polyalkylene glycols, petroleum jelly or any other known carrier used for the preparation of medicaments. The pharmaceutical preparations may be in solid from, for example as tablets, dragees, suppositories or capsules; in liquid form, for example as solution, emulsion or suspensions. If desired, they may be sterilized and/or contain auxiliary substances, such as preserving agents, stabilizing agents, wetting or emulsifying agents, salts for varying the osmotic pressure or buffers. They may also contain, in combination, other therapeutically useful substances.

EXAMPLE 1

2.7 g. of 5-(3,5-diacetoxy-4-methoxy-benzyl)-hydantoin were stirred for 26 hours under reflux conditions in an atmosphere of argon in the presence of 10 ml. of 60% sulfuric acid, whereupon a hot solution of 32.7 g. of barium hydroxide octahydrate in 150 ml. of water was added dropwise to the hot solution. The neutral mixture was brought to the boil for a short while and filtered while hot. The filtrate was concentrated to dryness under reduced pressure and the solid residue was recrystallized from water/acetonitrile after decoloration with animal charcoal. DL-3,5-dihydroxy-4-methoxy-phenylalanine was thus obtained. It was air-dried and found to contain 1.5 moles of water of crystallization. The product melted at 272–275° C. The water of crystallization can be eliminated by drying at 100° C. The anhydrous compound is strongly hydroscopic.

The DL - 5-(3,5-diacetoxy-4-methoxy-benzyl)-hydantoin used as starting material can be obtained as follows:

50 g. of crude 3,5-dihydroxy-4-methoxy-benzoic acid were stirred for 4 hours at 140° C. in an atmosphere of argon with 200 ml. of acetic anhydride and then poured in 300 ml. of hot water (95° C.). The mixture was heated to boiling, was kept for 5 minutes at the boil, and then cooled down. Some sodium chloride was added, whereupon the mixture was extracted with ethyl acetate, dried and concentrated. A dark oil was thus obtained, which gradually crystallized. The product, after a few hours was digested with petroleum ether and filtered. 3,5-diacetoxy-4-methoxy-benzoic acid was thus obtained as crystals melting at 109–111° C.

69.0 g. of that product was stirred for 1½ hours at 70° C. in an atmosphere of argon with 22 g. of thionyl chloride. The mixture was then concentrated under reduced pressure and, in order to eliminate the thionyl chloride, twice evaporated with absolute benzene and taken up in benzene. This solution was filtered through 250 g. of aluminum oxide (neutral; activity grade I). The light brown filtrate was concentrated to dryness and the crystals obtained were dried at 60° C. under high vacuum. The 3,5-diacetoxy-4-methoxy-benzoyl chloride thus obtained can be used without further purification. A sample thereof melted at 102–103° C. (after two recrystallizations from benzene/petroleum ether).

55 g. of the product thus obtained were stirred at 100° C. with 300 ml. of absolute xylene, 15 g. of 5% palladium/barium sulphate and 5 drops of Rosenmund regulator (quinoline-sulphur). Simultaneously, hydrogen gas was conducted through the solution and the escaping hydrogen chloride absorbed in sodium hydroxide solution. Once the calculated amount of hydrogen chloride was formed (after about 2½ hours), the reaction mixture was filtered hot, concentrated and treated with diisopropyl ether. Upon scratching with a glass rod, crystallization started. Some petroleum ether was added to the crystalline mass, which was to stand for 12 hours at 0° C. The 3,5 - diacetoxy - 4 - methoxybenzaldehyde thus obtained melted at 48–50° C. after drying. The crude aldehyde was purified by distillation; boiling point about 170° C./0.1 torr; melting point 52–53° C. The substance melted at 57° C. after one recrystallization from isopropyl ether/petroleum ether.

10.0 g. of 3,5-diacetoxy-4-methoxy-benzaldehyde, 4.6 g. of hydantoin, 20 ml. of acetic anhydride and 6.5 g. of anhydrous sodium acetate were stirred 40 minutes at 130° C. under argon. To the still hot reaction mixture were added 40 ml. of dioxane and 40 ml. of water, whereupon the mixture was heated for 5 minutes to boiling and then cooled down. The precipitation thus formed was triturated with water, filtered off, water washed and dried. The yellowish crystals of 5-(3,5-diacetoxy-4-methoxybenzylidene) - hydantoin thus obtained were dissolved in hot glacial acetic acid, cooled down and some diisopropyl ether added thereto. The product thus obtained melted at 250–255° C. (decomposition). After one more recrystallization the product melted at 255–258° C. (decomposition).

1.7 g. of 5-(3,5-diacetoxy-4-methoxy-benzylidene)-hydantoin were dissolved in 5 ml. of dimethyl formamide and, after addition of 15 ml. of glacial acetic acid, hydrogenated at room temperature and atmospheric pressure in the presence of 0.8 g. of 10% palladium on charcoal. The hydrogenation was terminated after 15 minutes, whereupon the solution was filtered and concentrated, and some diisopropyl ether/petroleum ether added thereto. The snow-white crystals obtained were filtered and dissolved in some cold glacial acetic acid, and diisopropyl ether added until turbidity occurs. The obtained DL-5-(3,5-diacetoxy-4-methoxy-benzyl)-hydantoin melted at 165° C.

EXAMPLE 2

5 g. of 3,5-bis-(benzoyloxy)-4-methoxy-benzyl-formamidomalonic acid dimethyl ester in 100 ml. of 2 N aqueous hydrochloric acid were boiled for 24 hours under argon. The solution was then cooled down, extracted with 200 ml. of ethyl acetate and concentrated under diminished pressure. The residue was dissolved in 10 ml. of methanol, and 2 ml. of propylene oxide was added and the mixture kept for 3 hours at room temperature and 14 hours at 4° C. The crystals that precipitated out were filtered off and recrystallized once from water. The DL-3,5-dihydroxy-4-methoxy-phenyl-alanine is identical with the compound obtained according to Example 1.

The 3,5-bis-(benzoyloxy) - 4 - methoxy-benzyl formamido malonic acid dimethyl ester used as starting compound can be obtained as follows:

17 g. of benzoyl chloride and 50 ml. of 2 N sodium hydroxide solution were added dropwise, under stirring at a temperature between 0° C. and 5° C. and under argon, to 9.2 g. of 3,5-dihydroxy-4-methoxy-benzoic acid in 50 ml. of 2 N sodium hydroxide solution at such a speed that the pH of the mixture remained at 8–9. Stirring was continued for 15 minutes at 0° C. The supernatant solution was then separated from the precipitate formed. The precipitate was washed with 50 ml. of 2 N sodium hydroxide solution and 50 ml. of water, whereupon 50 ml. of 6 N sulphuric acid were added and the mixture extracted twice with a mixture of 200 ml. of acetic ester and 40 ml. of absolute tetrahydrofuran each time. The organic phases were twice washed with 50 ml. each of saturated sodium chloride solution, united, dried over sodium sulphate, filtered and concentrated under toluene and ether/petroleum ether, there was obtained 3,5-bis(benzoyloxy)-4 - methoxy-benzoic acid as colorless crystals melting at 203–205° C.

To a solution of 5.0 g. of boron trifluoride etherate in 50 ml. of ethylene glycol dimethyl ether was added dropwise a solution of 3 g. of sodium borohydride in 200 ml. absolute ethylene glycol dimethyl ether while stirring under argon. The mixture was poured into a solution of 1.5 g. of 3,5-bis-(benzoyloxy)-4-methoxy-benzoic acid in 50 ml. ethylene glycol monomethyl ether. The solution was left standing for 5 hours whereupon, while cooling with ice, 20 ml. of water was added dropwise. The mixture was extracted with ethyl acetate, twice with saturated sodium chloride solution, twice with sodium hydrogen carbonate solution and again twice with saturated sodium chloride solution, dried and concentrated. The thus obtained 3,5-bis-(benzoyloxy) - 4 - methoxy-benzyl alcohol melted at 124–126° C.

3.8 g. of 3,5-bis(benzoyloxy)-4-methoxy-benzyl alcohol was dissolved, under anhydrous conditions, in 80 ml. of absolute benzene. After cooling down to 5° C., 2.0 g. of phosphorus pentachloride was added portionwise to the solution. The reaction mixture was stirred for 1 hour at 0° C. and 4 hours at room temperature, then concentrated under reduced pressure and reconcentrated three times after the addition of some toluene each time. The residue is taken up in ether, washed with sodium bicarbonate solution, dried and concentrated. The residual oil is chromatographed on a short column of aluminum oxide and eluted with benzene. There is thus obtained 3,5-bis-(benzoyloxy)-4 - methoxy-benzyl chloride as a light-green oil, which is uniform on the thin-layer chromatogram.

This compound can be used without further purification.

1.06 fo formamido malonic acid dimethyl ester were added dropwise at room temperature, while stirring under argon, to a solution of 145 mg. of sodium hydride in 30 ml. of dimethyl formamide. The mixture was heated for one hour at 60° C. and cooled to room temperature. Thereupon, a solution of 2.4 g. of crude, 3,5-bis-(benzoyloxy) - 4 - methoxy-benzyl chloride in dimethyl formamide was added at room temperature. The mixture was kept for 12 hours at room temperature and then stirred for 3 hours at 70° C. The reaction mixture was shaken with ethyl acetate and the organic phase was washed twice with sodium chloride solution, dried and evaporated to dryness. After chromatography on silica gel and 2 recrystallizations from toluene, there was obtained 3,5-bis-(benzoyloxy) - 4 - methoxy-benzyl formamido malonic acid dimethyl ester melting at 173–174° C.

EXAMPLE 3

11.6 g. of 3,5-bis-(phenyl-sulphonyloxy) - 4 - methoxy-benzyl-formamido malonic acid dimethyl ester was refluxed for 48 hours in a mixture of 200 ml. of 3 N aqueous hydrochloric acid and 80 ml. of glacial acetic acid. By this time, evolution of carbon dioxide subsided and solution completed. The solution was cooled down, and the precipitated crystals filtered off and recrystallized twice from malonitrile/ether. The product thus obtained, DL-3,5 - bis-(phenyl-sulphonyloxy) - 4 - methoxy-phenyl-alanine hydrochloride, melted at 164–167° C. (decomposition).

5 g. of the product thus obtained, in 100 ml. of 4 N aqueous barium hydroxide solution, were heated for 14 hours at 150° C. in an autoclave under argon. The reaction mixture was cooled down and then brought to pH 5 by the addition of 2 N aqueous sulfuric acid. The solution was then filtered, washed with 50 ml. of hot water and the combined filtrates concentrated under reduced pressure to a volume of about 10 ml. The concentrated solution was cooled down, the precipitated crystals filtered off and recrystallized once from water. The DL-3,5-dihydroxy - 4 - methoxy-phenyl-alanine sesquihydrate thus obtained melted at 267–269° C.

The 3,5 - bis-(phenyl-sulphonyloxy) - 4 - methoxy-benzyl-formamido malonic acid dimethyl ester used as starting material can be obtained as follows:

550 g. of benzene sulphochloride were added dropwise, with stirring under argon, to a solution of 182 g. of gallic acid methyl ester in 1000 ml. of absolute pyridine at such a rate that the temperature did not exceed 70° C. Stirring was continued for 3 hours at 80° C., whereupon the mixture was cooled to 10° C. and poured onto 2000 ml. of ice-water. The precipitate was initially oily and became crystalline upon warming at 20° C. The crystals were filtered off, washed with water and, after drying, recrystallized twice from methylene chloride/methanol. The 3,4,5-tris-(phenyl-sulphonyloxy)-benzoic acid methyl ester thus obtained melted at 119–121° C.

60 g. of the product thus obtained was heated together with 300 ml. of liquid ammonia for 14 hours at 23° C. After the elimination of ammonia with a stream of nitrogen gas, the residue was heated to 50° C. with 300 ml. of methanol and 400 ml. of water, and then cooled down to 10° C. The crystals formed were filtered off and suspended in 200 ml. of water at 50° C. The suspension was brought to pH 2 by the addition of 2 N aqueous sulfuric acid and then cooled again. The crystals were filtered off and recrystallized once from methanol. The 3,5-bis-(phenyl-sulphonyloxy) - 4 - hydroxy-benzoic acid methyl ester thus obtained melted at 157–160° C.

A mixture of 30.9 g. of the ester thus obtained, 288 ml. of absolute dimethylformamide, 11.5 g. of dimethyl sulphate and 36 g. of potassium carbonate were heated for 14 hours at 70° C. while stirring. The insoluble parts are filtered off and washed with 200 ml. of absolute dimethylformamide. The filtrate was concentrated under diminished pressure. The oily residue crystallized on heating with 200 ml. of 2 N aqueous acetic acid. The crystals were filtered off, washed with water and recrystallized twice from methanol. The 3,5-bis-(phenyl-sulphonyloxy)-4-methoxy-benzoic acid methyl ester thus obtained melted at 105–107° C.

A mixture of 10 g. of 3,5-bis-(phenyl-sulphonyloxy)-4-methoxy-benzoic acid methyl ester, 45 ml. of glacial acetic acid, 2.5 ml. of concentrated sulfuric acid and 5 ml. of water were boiled for 5 hours under argon. After cooling, the reaction mixture was mixed with 100 ml. of water and concentrated to a volume of 50 ml. under reduced pressure. The concentrated solution was mixed with 50 ml. of water and cooled down to 0° C. The crystals formed were filtered off, washed with cold water, dried and recrystallized from ethyl acetate/petroleum ether. The 3,5 - bis-(phenyl-sulphonyloxy)-4-methoxy-benzoic acid thus obtained melted at 179–182° C.

12.0 g. of the product thus obtained were suspended in 130 ml. of pure chloroform and, after addition of 12 ml. of thionyl chloride, refluxed for 5 hours. The solution was concentrated under reduced pressure and the residue freed of thionyl chloride by concentrating twice after addition of absolute toluene. The residue was recrystallized once from toluene. The 3,5-bis-(phenyl-sulphonyloxy) - 4 - methoxy-benzoyl chloride thus obtained melted at 120–123° C.

7 g. of sodium borohydride was introduced in a mixture of 23 ml. of water and 70 ml. of absolute dioxane while stirring. To this mixture was added portionwise, under ice-cooling and at a temperature between 10–20° C., 50.8 g. of 3,5 - bis-(phenyl-sulphonyloxy)-4-methoxy-benzoyl chloride. The reaction mixture was then stirred for 2 hours at 20° C. After the addition of 150 ml. of ice-water and 6 N aqueous sulfuric acid until pH 1, the mixture was extracted twice with 600 ml. of ethyl acetate each time. The organic extracts were washed twice with 200 ml. of water, 200 ml. of saturated sodium hydrogen carbonate solution and 100 ml. of water each time, dried over sodium sulphate and concentrated under reduced pressure. From the residue there was obtained, after recrystallization from toluene, 3,5-bis-(phenyl-sulphonyloxy) - 4 - methoxy-benzyl alcohol melting at 98–102° C.

32.3 g. of the alcohol just obtained was kept boiling for 14 hours with 320 ml. of absolute benzene and 65 ml. of thionyl chloride. The reaction mixture was concentrated under reduced pressure and residual thionyl chloride eliminated by several concentrations with toluene. After two recrystallizations from ethyl acetate/petroleum ether of the crystalline residue, there was obtained 3,5-bis-(phenyl-sulphonyloxy) - 4 - methoxy-benzyl chloride as colorless crystals melting at 103–105° C.

10 g. of 3,5-bis-(phenyl-sulphonyloxy) - 4 - methoxybenzyl chloride in 25 ml. of absolute dimethyl formamide was added, in one portion, to a solution of sodium formamido-malonic acid dimethyl ester (prepared from 0.5 g. of sodium hydride and 3.85 g. of formamido-malonic acid dimethyl ester) in 50 ml. of absolute dimethyl formamide while stirring at 20° C. under argon. The reaction product was then stirred for 12 hours at room temperature and then 2 hours at 70° C., cooled down and concentrated under reduced pressure after the addition of 0.5 ml. of glacial acetic acid. The oily residue was taken up in 100 ml. of glacial acetic acid and 50 ml. of absolute tetrahydrofuran and extracted once with 50 ml. of water and twice with 50 ml. of saturated brine each time. The aqueous phases were extracted with 150 ml. of ethyl acetate/tetrahydrofuran (2:1). The organic extracts were combined, dried over sodium sulphate and concentrated under reduced pressure. The oily residue crystallized after digestion with methanol. After recrystallization from methanol, there was obtained 3,5-bis-(phenyl-sulphonyloxy) - 4 - methoxy-benzyl-formamido- malonic acid dimethyl ester as colorless crystals melting at 142–146° C.

EXAMPLE 4

DL-3,5-dihydroxy - 4 - methoxy-phenyl alanine was obtained in the same manner as in Example 3 starting from -3,5-bis-(methane-sulphonyloxy) - 4 - methoxy-benzyl-formamido-malonic acid dimethyl ester via
-DL-3,5 - bis-(methane-sulphonyloxy) - 4 - methoxy-phenyl alanine.

The compound thus obtained was identical with that obtained in Example 3.

The 3,5-bis-(methane-sulphonyloxy)-4-methoxy - benzyl-formamido-malonic acid dimethyl ester used as starting material can be obtained in the same manner as described in Example 3, starting from gallic acid methyl ester via -3,4,5-tris-(methane-sulphonyloxy) - benzoic acid methyl ester (melting point 159–162° C. from methylene chloride/methanol)
-3,5-bis-(methane-sulphonyloxy)-4-hydroxy - benzoic acid methyl ester (melting point 143–146° C. from methanol)
-3,5-bis-(methane-sulphonyloxy)-4-methoxy-benzoic acid methyl ester (melting point 95–98° C. from ethyl acetate/ether)
-3,5-bis-(methane-sulphonyloxy)-4-methoxy-benzoic acid (melting point 145–148° C. from ethyl acetate)
-3,5-bis-(methane-sulphonyloxy) - 4 - methoxy-benzoyl chloride (melting point 77–80° C. from toluene)
-3,5-bis-(methane-sulphonyloxy)-4-methoxy - benzyl alcohol (melting point 77–80° C. from ethyl acetate/ether) and
-3,5-bis-(methane-sulphonyloxy) - 4 - methoxy - benzyl chloride.

The 3,5 - bis - (methane-sulphonyloxy)-4-methoxy-benzyl-formamido-malonic acid dimethyl ester thus obtained melted at 143–145° C. (from ethyl acetate).

EXAMPLE 5

2.1 g. of 3,5-bis-(methoxy-methoxy)-4-methoxy - benzyl-formamido-malonic acid dimethyl ester were refluxed for 2 hours under argon with 25 ml. of methanol and 0.1 g. of p-toluene sulphonic acid. Some sodium acetate was added to the mixture and the methanol formed is distilled off. After the addition of 25 ml. of 2 N hydrochloric acid, the mixture was refluxed for 3 hours and then concentrated to dryness under reduced pressure. The oily residue was taken up in some water/acetonitrile and excess propylene oxide was added thereto. The DL-3,5-dihydroxy - 4 - methoxy-phenyl-alanine crystallized out within 12 hours. After recrystallization from water/acetonitrile, there was obtained a compound that was identical with the DL-3,5-dihydroxy-4-methoxy-phenyl-alanine obtained according to the previous examples.

The 3,5-bis-(methoxy-methoxy) - 4 - methoxy-benzyl-formamido-malonic acid methyl ester used as starting material can be obtained as follows:

25 g. of 3,5-dihydroxy-4-methoxy-benzoic acid methyl ester was dissolved in 42 ml. of absolute methanol and then added dropwise, within 5 minutes, to a solution of 2.9 g. of sodium in 42 ml. of methanol. 9.5 ml. of freshly distilled choromethyl methyl ester was then added, in the course of 20 minutes, while cooling and at an internal temperature of 0 to −5° C. 2.9 g. of sodium and 9.5 ml. of chloro-methyl methyl ether were then added successively in three portions. The reaction mixture was then filtered and the filtrate concentrated to a dark oil. This oil was taken up in ether, washed with water, twice with ice-cold 2 N sodium hydroxide solution and once with saturated brine, dried over calcium chloride and concentrated. The residue was treated with ether/petroleum ether. There was thus obtained 3,5-bis-(methoxy-methoxy)-4-methoxy-benzoic acid methyl ester melting at 70° C.

20.0 g. of the ester thus obtained were stirred for four hours at room temperature with 3.5 g. of lithium aluminum hydride in 250 ml. of absolute tetrahydrofuran. Ethyl acetate and water were added and the reaction mixture filtered and concentrated. The oily residue was taken up in ether, washed with water, 2 N sodium hydroxide solution and saturated brine, dried over sodium sulphate and concentrated to an oil. The 3,5-bis-(methoxy-methoxy)-4-methoxy-benzyl alcohol thus obtained was uniform on the thin layer chromatogram and may be used without further purification.

To a mixture of 0.5 g. of sodium hydride, 0.5 g. of mineral oil and 25 ml. of absolute tetrahydrofuran was added dropwise a solution of 4.4 g. of 3,5-bis-(methoxy-methoxy)-4-methoxy-benzyl alcohol in 25 ml. of absolute tetrahydrofuran. The evolution of hydrogen subsided after 3 hours. The mixture was then treated within 15 minutes, under cooling at 0° C., with a solution of 3.25 g. of p-toluene sulphonyl chloride in 25 ml. of absolute tetrahydrofuran. This was stirred for 12 hours, filtered and processed further as it was.

0.85 g. of a 50% sodium hydride suspension in mineral oil and 25 ml. of absolute dimethylformamide were treated, dropwise, with a solution of 3.0 g. of formamidomalonic acid dimethyl ester in 25 ml. of absolute dimethylformamide. This mixture was treated with the tetrahydrofuran solution obtained above and stirred for 2 hours at 50° C. and 3 hours at 90° C. The whole was poured on ice, extracted with chloroform, washed with brine and dried over sodium sulphate and concentrated. The oily residue crystallized on standing in the cold. After recrystallization from benzene/petroleum ether, there was obtained 3,5-bis-(methoxy-methoxy)-4-methoxy - benzyl formamido - malonic acid dimethyl ester melting at 121° C.

EXAMPLE 6

1.36 g. of DL - 5-[3,5-bis-(methoxy-methoxy)-4-methoxy-benzyl]-hydantoin, 6.0 g. of barium hydroxide octahydrate and 25 ml. of water were refluxed for 52 hours and treated subsequently, under reflux, for one hour with carbon dioxide gas until pH 7 was attained. The whole was filtered, washed with hot water and concentrated to 10 ml. under reduced pressure. The residue was treated with 10 ml. of 2 N hydrochloric acid and boiled for 1 hour, about 10–20 ml. of distillate being thus eliminated. The solution was concentrated to dryness under reduced pressure, the residue taken up in ethanol and the pH adjusted to 6 by means of diethylamine. Upon standing at 0° C. there was obtained DL-3,5-dihydroxy-4-methoxy-phenyl-alanine as crystals which proved to be identical, after recrystallization with water-acetonitrile, with the compound obtained in the foregoing examples.

The DL-5-[3,5-bis-(methoxy-methoxy) - 4 - methoxy-benzyl]-hydantoin used as starting material may be obtained as follows:

A solution of 6.9 g. of sodium in 100 ml. of methanol was added to a solution of 25.2 g. of 3,5-diacetoxy-4-methoxy-benzaldehyde in 100 ml. of methanol. 22.5 ml. of chloro-methyl methyl ether was added dropwise at a temperature of 0° to —5° C. 2.3 g. of sodium and 7.5 ml. of chloro-methyl methyl ether were then added successively in three batches. The reaction mixture was filtered and the filtrate concentrated, distributed between ether and water. The ether phase was washed twice with ice-cold 2 N sodium hydroxide solution and twice with saturated brine, dried over sodium sulphate and concentrated. The residue was distilled under reduced pressure and the 3,5-bis-(methoxy-methoxy)-4-methoxy-benzaldehyde thus obtained boiled at 145° C./0.5 mm.

9.6 g. of 3,5-bis-(methoxy-methoxy)-4-methoxy-benzaldehyde, 4.2 g. of hydantoin and 3.9 g. of anhydrous sodium acetate in 15 ml. of acetic anhydride were stirred for ½ hour at 130° C. under argon, whereupon 50 ml. of water was added. The reaction mixture was extracted with ethyl acetate and the organic phase was then washed with water, sodium hydrogen carbonate solution and ultimately with brine, dried over sodium sulphate and evaporated to dryness. The crystals obtained were recrystallized from isopropanol. The 5 - [3,5-bis-(methoxy-methoxy)-4-methoxy-benzylidene]-hydantoin thus obtained melted at 165–166° C.

3.38 g. of the product thus obtained were dissolved in 22 ml. of 1 N sodium hydroxide and hydrogenated in the presence of 0.7 g. of 5% palladium-on-carbon. The calculated amount of hydrogen was absorbed within ½ hour. After filtration, the pH of the filtrate was adjusted to 7 by means of 1 N hydrochloric acid. After the addition of sodium chloride, the solution was extracted with ethyl acetate. The organic phase was washed with brine, dried over sodium sulphate and concentrated. The crystalline residue was recrystallized from isopropanol-diisopropyl ether. There was thus obtained DL-5-[3,5-bis-(methoxy-methoxy)-4-methoxy-benzyl]-hydantoin melting at 133–134° C.

EXAMPLE 7

15 g. of bis-(tetrahydro-pyranyloxy)-4-methoxy-benzyl-formamido-malonic acid dimethyl ester in 200 ml. of 3 N sulfuric acid were boiled for 12 hours under argon. The dark-brown reaction mixture obtained was cooled down and extracted twice with 200 ml. of ethyl acetate each time. The combined ethyl acetate extracts were washed with 100 ml. of water, the aqueous extracts combined, concentrated under reduced pressure to about 200 ml., whereupon the pH of the mixture was brought to 5 by means of saturated aqueous barium hydroxide solution under argon. The precipitated barium sulphate was filtered off and washed with 100 ml. of hot water. The wash water was combined with the filtrate and concentrated under reduced pressure to about 20 ml. 15 ml. of ethanol was added and the whole kept for 12 hours at 4° C. The precipitated colorless crystals were filtered off, washed with ethanol and ether and dried. The DL-3,5-dihydroxy-4-methoxy-phenyl alanine sesquihydrate thus obtained melted at 268–271° C.

The 3,5-bis-(tetrahydro - pyranyloxy) - 4 - methoxy-benzyl formamido malonic acid dimethyl ester used as starting material may be obtained as follows:

A mixture of 20 g. of gallic acid methyl ester, 40 ml. of absolute tetrahydrofuran and 38 g. of dihydropyran was treated with 0.05 ml. of phosphorous oxychloride. The temperature rose spontaneously to 34° C., whereupon the mixture was kept for 12 hours at room temperature. The clear solution obtained was added to a mixture of 400 ml. of absolute dimethyl formamide and 67 g. of potassium carbonate. 21 g. of dimethyl sulphate was then added and the whole stirred for 12 hours at 70° C. under argon. The mixture was cooled down, filtered, washed with 100 ml. of absolute dimethyl formamide and the combined filtrates were concentrated under reduced pressure. The residue was distributed between 300 ml. of toluene and 100 ml. of water, and the water phase extracted once more with 200 ml. of toluene. The toluene extracts were combined, dried over sodium sulphate and concentrated under reduced pressure. The residue was refluxed for 1 hour in 100 ml. of absolute methanol in the presence of 1 g. of oxalic acid dihydrate and cooled down, whereupon 50 ml. of water was added and the mixture extracted twice with 200 ml of petroleum ether each time. The petroleum ether extracts were washed with 100 ml. of water/methanol (1:1). The aqueous methanolic extracts were concentrated under reduced pressure to 30 ml. The pH of the concentrated solution was brought to 5 by means of saturated aqueous sodium bicarbonate solution and kept for 48 hours at 4° C. The precipitate was filtered off, washed with a small amount of water and dried. The crystals were heated with 400 ml. of benzene, whereby a part thereof went into solution. The undissolved crystals were filtered off while hot and washed with 100 ml. of boiling benzene. Gallic acid methyl ester of melting point 192–198° C. was obtained as by-product. The filtrate was combined with the benzene washings, concentrated under reduced pressure to about 200 ml. and then kept for 12 hours at 4° C. The precipitated colorless crystals were filtered off, washed with petroleum ether and dried. The 3,5-dihydroxy-4-methoxy-benzoic acid methyl ester thus obtained melted at 137–140° C.

A solution of 0.1 g. of p-toluene sulphonic acid monohydrate in 5 ml. of absolute tetrahydrofuran was added to a mixture of 20 g. of 3,5-dihydroxy-4-methoxy-benzoic acid methyl ester, 38 g. of dihydropyran and 50 ml. of absolute tetrahydrofuran previously cooled to 0° C. The mixture was kept for 10 hours at 10° C. and then for 24 hours at 20° C. The light-brown solution obtained was cooled down to 0° C., poured into 100 ml. of ice-cold 2 N aqueous hydroxide solution and extracted twice with 200 ml. of toluene each time. The toluene extracts were combined, washed with 100 ml. of 2 N soda lye and dried over sodium sulphate in the presence of sodium bicarbonate, filtered and concentrated under reduced pressure. The oily residue crystallized upon digestion with petroleum ether. After three recrystallizations from ether/petroleum ether, there was obtained 3,5-bis-(tetrahydro-pyranyloxy)-4-methoxy-benzoic acid methyl ester as colorless crystals of melting point 93–96° C.

A solution of 20 g. of 3,5-bis-(tetrahydro-pyranyloxy)-4-methoxy-benzoic acid methyl ester in 70 ml. of absolute tetrahydrofuran was added dropwise, while stirring, to 2 g. of lithium aluminum hydride in 150 ml. of absolute ether at a temperature between 0–10° C. under argon. Stirring was continued for an hour at room temperature and 5 hours at reflux. Then 6 ml. of acetic ester and 6 ml. of water were successively added dropwise under cooling with ice/methanol. After the addition of 100 ml. of ether the solution was boiled and the precipitate filtered off, boiled twice with 200 ml. of ether/tetrahydrofuran each time, and the solution filtered. The combined filtrates were filtered under reduced pressure together with 100 ml. of absolute toluene. The oily residue was taken up in 200 ml. of benzene and shaken twice with 50 ml. of 2 N aqueous soda lye each time. The alkaline extracts were combined and extracted with 100 ml. of benzene. The benzene extracts were combined, dried over potassium carbonate, filtered and concentrated. The 3,5-bis-(tetrahydro-pyranyloxy)-4-methoxy-benzyl alcohol was obtained as an oil, which is uniform on the thin-layer chromatogram. This compound can be used without further purification.

A solution of 23.3 g. of 3,5-bis-(tetrahydro-pyranyloxy)-4-methoxy-benzyl-alcohol in 80 ml. of absolute toluene was added in one portion to a suspension of 1.65 g. of sodium hydride in 50 ml. of absolute toluene. Once the initial reaction subsided, the whole was stirred for 14 hours at 40° C. under argon. The light-yellow suspension obtained was cooled down to −17° C. A solution of 13 g. of p-toluene sulphonyl chloride in 50 ml. of absolute toluene was then added dropwise over 15 minutes to the solution, while cooling with an ice-methanol mixture. The mixture solidified to a gel-like mass, which reliquefied on heating to room temperature. 100 ml. of absolute ether was added and the whole stirred for 4 hours at 40° C. After cooling down, 100 ml. of ethyl acetate was added and the mixture extracted twice with 100 ml. of water each time. The aqueous extracts were combined and extracted with 200 ml. of ethyl acetate. The ethyl acetate extracts were combined, dried over sodium sulphate in the presence of sodium bicarbonate, filtered and concentrated at 25° C. under reduced pressure. The oily residue crystallized on digestion with ether/petroleum ether. The 3,5 - bis - (tetrahydro-pyranyloxy) - 4-methoxy-benzyl-p-toluene sulphonate thus obtained was used without further purification. A sample was recrystallized once from ether/petroleum ether and yielded colorless crystals which decomposed and turned black on heating above 40° C.

A solution of 50 g. of 3,5-bis-(tetrahydro-pyranyloxy)-4-methoxy-benzyl-p-toluene sulphonate in 100 ml. of absolute dimethylformamide was added dropwise, under ice-cooling, over 15 minutes, to a solution of sodium formamide-maloinc acid dimethyl ester (prepared from 4.8 g. of 50% sodium hydride, 17.5 g. of formamide-malonic acid dimethyl ester and 200 ml. of absolute dimethylformamide). Stirring was then continued for 12 hours at room temperature and 2 hours at 70° C. After cooling down, the reaction mixture was concentrated under reduced pressure. The residue was distributed between 300 ml. of ethyl acetate and 200 ml. of water. The aqueous phase was extracted with 300 ml. of ethyl acetate. Each of the ethyl acetate extracts is washed with 100 ml. of 2 N aqueous soda lye, then combined and concentrated under reduced pressure after drying over sodium sulphate. The residue was recrystallized several times from ethyl acetate/petroleum ether. The 3,5-bis-(tetrahydro-pyranyloxy)-4-methoxy-benzyl-formamide-malonic acid dimethyl ester was obtained as colorless crystals melting at 113–114° C.

EXAMPLE 8

A mixture of 15 g. of 3,5-bis-(tetrahydro-pyranyloxy)-4-methoxy-formamide-malonic acid dimethyl ester, 150 ml. of absolute methanol and 1 g. of oxalic acid was boiled for 30 minutes under argon. 50 ml. of water added to the cooled solution, which was then extracted twice with 200 ml. of petroleum ether (boiling range 40–45° C.) each time. The petroleum ether extracts were washed with 100 ml. of methanol/water (3:1) and discarded. The methanol/water extracts were combined, concentrated under reduced pressure to about 150 ml. and cooled down to 4° C. The precipitated crystals were filtered off, washed with 20 ml. of water, dried and recrystallized once from ethyl acetate/ether. The 3,5-dihydroxy-4-methoxy-benzyl-formamide-malonic acid dimethyl ester thus obtained melted at 181–183° C.

The 3,5 - dihydroxy-4-methoxy-benzyl-formamido-malonic acid methyl ester may be converted into DL-3,5-dihydroxy - 4 - methoxy phenyl-alanine sesquihydrate according to the procedure described in Example 7 for the hydrolysis of the 3,5-ditetrahydro-pyranyloxy-4-methoxy-benzyl-formamido malonic acid dimethyl ester. The compound thus obtained is identical with the DL-3,5-dihydroxy-4-methoxy-phenyl-alanine sesquihydrate obtained according to Example 7.

EXAMPLE 9

5.2 g. of 5-(3,5 - dihydroxy-4-methoxy-benzylidene)-hydantoin in 50 ml. of dimethyl formamide was hydrogenated under ambient conditions in the presence of 1 g. of 5% palladium-on-carbon. The solution was filtered and the filtrate concentrated under reduced pressure. The residue was recrystallized twice from methanol-ether. The DL-5-(3.5-dihydroxy - 4 - methoxy-benzyl)hydantoin was obtained as colorless crystals melting at 225–227° C.

4.5 g. of the product thus obtained were refluxed for 72 hours with 50 ml. of 6 N aqueous sulfuric acid. The solution was cooled and its pH was brought to 5 by means of saturated barium hydroxide solution. The barium sulphate that precipitated was filtered off and washed with 100 ml. of hot water. The filtrate was combined with the wash water and concentrated to dryness under reduced pressure. The residue was dissolved in 5 ml. of hot water and 10 ml. of methanol was added to the solution, which was then cooled down. The crystalline DL-3,5-dihydroxy-4-methoxy-phenyl-alanine thus obtained was identical with the product obtained in the foregoing example.

The 5 - (3,5-dihydroxy-4-methoxy-benzylidene)-hydantoin used as starting material may be obtained as follows:

9 g. of 5-(3,5-diacetoxy-4-methoxy-benzylidene)-hydantoin was dissolved in 54 ml. of 2 N aqueous sodium hydroxide and kept for 5 hours at room temperature and ½ hour at 40° C. The solution was cooled down and acidified with 6 N sulfuric acid. The crystals that precipitate were filtered off and recrystallized once from dimethyl formamide/water. The 5-(3,5 - dihydroxy-4-methoxy-benzylidene)-hydantoin was thus obtained as light-yellow crystals melting at 296–298° C.

EXAMPLE 10

DL-3,5 - dihydroxy-4-methoxy-phenyl-alanine was N-acylated in the presence of a weak base, e.g., potassium bicarbonate or sodium carbonate, by means of an acylating agent such as acetic anhydride or an acetic acid halide. The DL-3,5-dihydroxy-4-methoxy-phenyl-N-acetyl-alanine thus obtained was dissolved in ethanol and reacted with the equivalent amount of brucine. The brucine salt which crystallized out after 2 to 3 days standing at room temperature was isolated and resolved by addition of a cold saturated barium hydroxide solution. The freed brucine was then extracted with chloroform. The aqueous phase was treated with the amount of sulfuric acid needed to react with the barium. The precipitated barium sulphate was filtered off. The aqueous filtrate was concentrated under reduced pressure. The residual L-3,5-dihydroxy-4-methoxy-phenyl-alanine was purified by dissolving in a small amount of water and precipitating from 3 to 4 times the volume of ethanol. The compound melted at 270–275° C.; $\alpha_D = -10°$ [ in N-hydrochloric acid; c.=1].

EXAMPLE 11

13.1 g. of DL-3,5-dihydroxy-4-methoxy-phenyl-alanine amide hydrochloride was dissolved in 200 ml. of water and reacted with 12.6 g. of mono-silver tartrate while stirring. The silver chloride thus formed was filtrated off after 15 minutes. The aqueous filtrate was strongly concentrated under reduced pressure and diluted with 2 to 3 times the volume of ethanol. The tartrate crystallizes out within 2 to 3 days and was isolated, washed with some ethanol and then decomposed by the addition of 2 N hydrochloric acid. The liberated tartaric acid was eliminated by exhaustive extraction with ether. The aqueous phase was refluxed for 3 to 4 hours and then concentrated under diminished pressure. The residue was then dried by repeated solution in ethanol and concentration, and then taken up in absolute ethanol. The precipitated ammonium chloride was filtered off. The pH of the solution was brought to about 5.5–6 by means of diethylamine. The precipitated L-3,5-dihydroxy-4-methoxy-phenyl-alanine melted at 270–275° C.; $\alpha_D = -10°$ [in N-hydrochloric acid; c.=1].

What is claimed is:
1. A compound of the formula

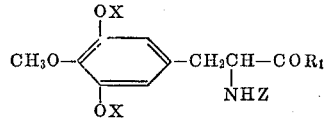

wherein X is selected from the group consisting of alkyl sulfonyl, phenyl sulfonyl, phenyl alkyl sulfonyl or alkyl phenyl sulfonyl; $R_1$ is hydroxy, alkoxy or substituted or unsubstituted amino wherein said substituted amino is selected from the group consisting of mono- or di-alkylamino, mono- or di-hydroxyalkylamino, piperidino or morpholino; and Z is hydrogen or acyl selected from the group consisting of alkanoyl, benzoyl, phenyl alkanoyl where the phenyl radical can be substituted with alkyl, alkoxy or halogen, carbalkoxy and carbophenylalkoxy; wherein said alkyl, alkanoyl and alkoxy groups contain from 1 to 6 carbon atoms; and optical isomers and salts thereof.

2. The compound of claim 1 wherein X is phenylsulfonyl, $R_4$ is (b), $R_1$ is hydroxy and Z is hydrogen; i.e., 3,5-bis-(phenylsulfonyloxy)-4-methoxy-phenylalanine.

3. The compound of claim 1 wherein X is mesyl, $R_4$ is (b), $R_1$ is hydroxy and Z is hydrogen; i.e., 3,5-bis-(mesyloxyl)-4-methoxy-phenylalanine.

References Cited

UNITED STATES PATENTS 3,344,023  9/1967  Reinhold et al. ____ 260—471 X

OTHER REFERENCES

Creveling et al., J. Med. Chem. vol. 11, pp. 595–506 (May 1968).

JOHN D. RANDOLPH, Primary Examiner

U.S. Cl. X.R.

424—303, 309; 260—240 F, 247.1, 260, 293.73, 307 A, 309.5, 349, 453 AR, 463, 465 D, 465 E, 465 F, 471 A, 473 R